(12) United States Patent
Takahashi et al.

(10) Patent No.: US 7,817,787 B2
(45) Date of Patent: Oct. 19, 2010

(54) VOICE MAIL APPARATUS AND CONTROL METHOD OF VOICE MAIL APPARATUS

(75) Inventors: Akira Takahashi, Tokorozawa (JP); Kazuharu Horiuchi, Tachikawa (JP); Hiroki Ida, Ome (JP); Nobuhiro Masaki, Kodaira (JP); Norimassa Niiya, Tachikawa (JP); Noriaki Ikeda, Hachioji (JP); Norikuni Noguchi, Kawaguchi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/264,067

(22) Filed: Nov. 3, 2008

(65) Prior Publication Data
US 2009/0154660 A1     Jun. 18, 2009

(30) Foreign Application Priority Data
Dec. 18, 2007     (JP)     ............................. 2007-326235

(51) Int. Cl.
H04M 1/64     (2006.01)
(52) U.S. Cl. .................. 379/88.25; 379/88.08; 700/94; 381/104
(58) Field of Classification Search .................. 700/94; 381/104; 379/67.1, 88.25, 88.08
See application file for complete search history.

(56) References Cited

U.S. PATENT DOCUMENTS

2006/0106472 A1 * 5/2006 Romesburg et al. ............ 700/94

2007/0153988 A1 * 7/2007 Ida ............................. 379/67.1

FOREIGN PATENT DOCUMENTS

| JP | 02-174355 | | 7/1990 |
|----|-----------|---|--------|
| JP | 06-303319 | | 10/1994 |
| JP | 2002091277 A | * | 3/2002 |
| JP | 2007-60041 | | 3/2007 |
| JP | 2007-174211 | | 7/2007 |
| WO | WO 2006/055058 | | 5/2006 |

OTHER PUBLICATIONS

Japanese Patent Application No. 2007-326235 Notice of Reasons for Rejection, mailed Feb. 12, 2009.

* cited by examiner

*Primary Examiner*—Fan Tsang
*Assistant Examiner*—Simon King
(74) *Attorney, Agent, or Firm*—Blakely, Sokoloff, Taylor & Zafman LLP

(57) ABSTRACT

According to one embodiment, a voice mail apparatus includes a voice processor which processes voice messages by a arbitrary processing gain, a gain controller which monitors a signal level of an output signal of the voice processor, and controls the processing gain of the voice processor to change the signal level into a specified level, and a processing controller which makes the gain controller to perform gain control of a learning voice by inputting a portion of the voice message into the voice processor as the learning voice when processing of the voice message is requested or based on predetermined conditions.

4 Claims, 4 Drawing Sheets

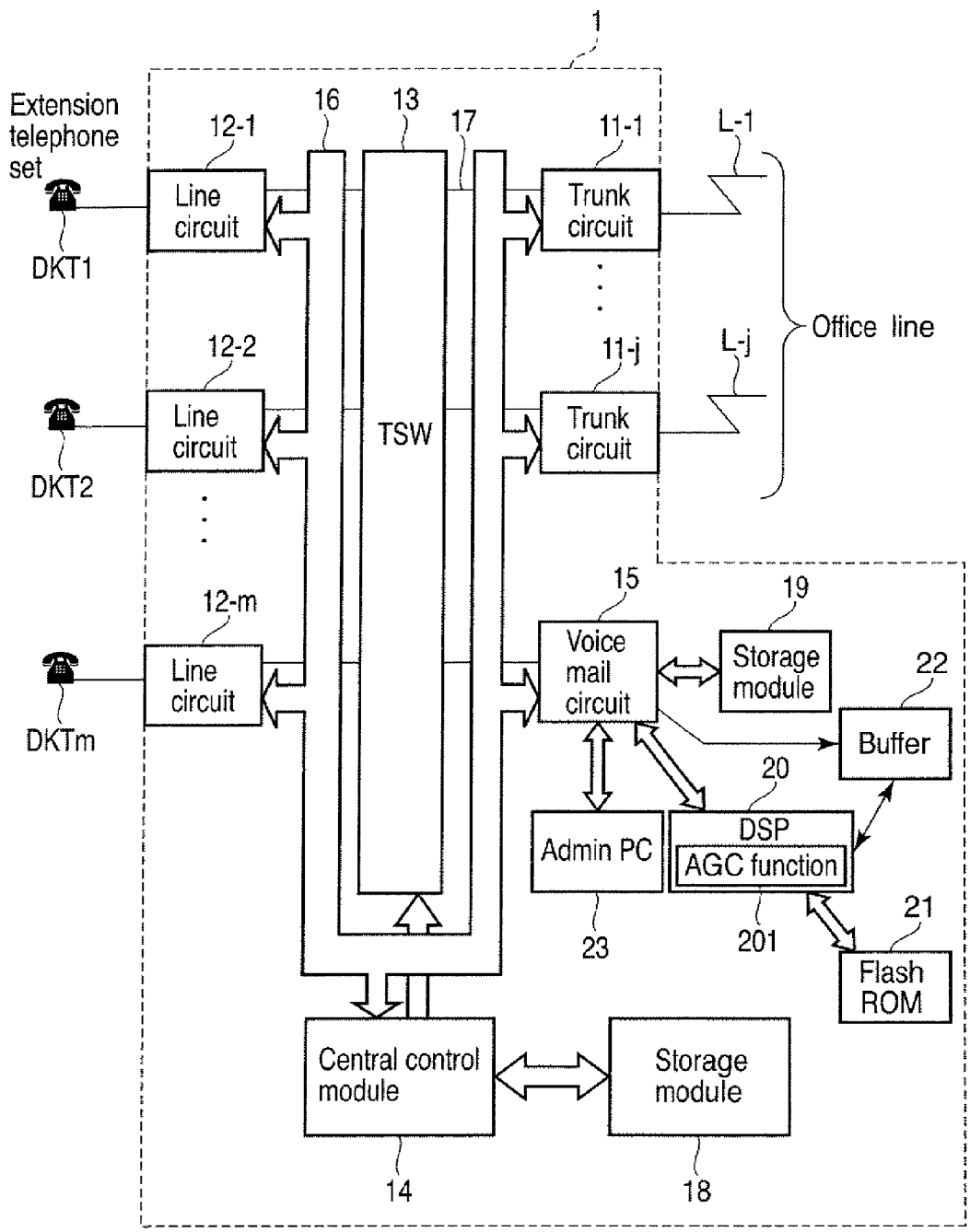
F I G. 1

VOICE MAIL APPARATUS AND CONTROL METHOD OF VOICE MAIL APPARATUS

CROSS-REFERENCE TO RELATED APPLICATIONS

This application is based upon and claims the benefit of priority from Japanese Patent Application No. 2007-326235, filed Dec. 18, 2007, the entire contents of which are incorporated herein by reference.

BACKGROUND

1. Field

One embodiment of the present invention relates to a voice mail apparatus that records a voice message from a calling party in any mail box or reproduces a voice message from any mail box and a method of controlling the voice mail apparatus.

2. Description of the Related Art

In office buildings and business places, for example, telephone exchange apparatuses such as PBX (private branch exchange) and key telephone apparatuses have frequently been used. A voice mail apparatus is connected to such a telephone exchange apparatus and has a function, for example, to transfer an incoming call arriving at an extension from an outside line to the voice mail apparatus when the extension housed in the telephone exchange apparatus is busy or not responding because the seat is left.

The voice mail apparatus has a function, for example, to store messages from telephones in a plurality of mail boxes.

Incidentally, in the voice mail apparatus, a DSP (digital signal processor) is first notified of a reproduction instruction of a reproduction message number to reproduce a voice message. The method of recording a voice message is similar to that of reproducing one. Therefore, it takes some time before an auto gain controller (AGC) stabilizes and the rising level of a message is low.

There has been proposed a voice mail apparatus which stores a learning voice file to be dummy voice messages in a memory, and when reproducing a voice message from any mail box, reads the learning voice file from the memory to input the file into the DSP to cause the DSP to execute the AGC in the learning voice file and also mutes voice to the requesting telephone terminal before performing processing of the voice message, and after processing of the learning voice file by the DSP terminates, inputs the voice message into the DSP for processing while maintaining a processing gain of the DSP (for example, Jpn. Pat. Appln. KOKAI Publication No. 2007-174211).

However, if a difference between "a gain value when started" and "an optimal gain value to voice" is large, it takes some time even for the above voice mail apparatus before the gain value of the AGC reaches the optimal value.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram showing the configuration of an exchange system according to a first embodiment of the present invention;

DETAILED DESCRIPTION

Figure 2:
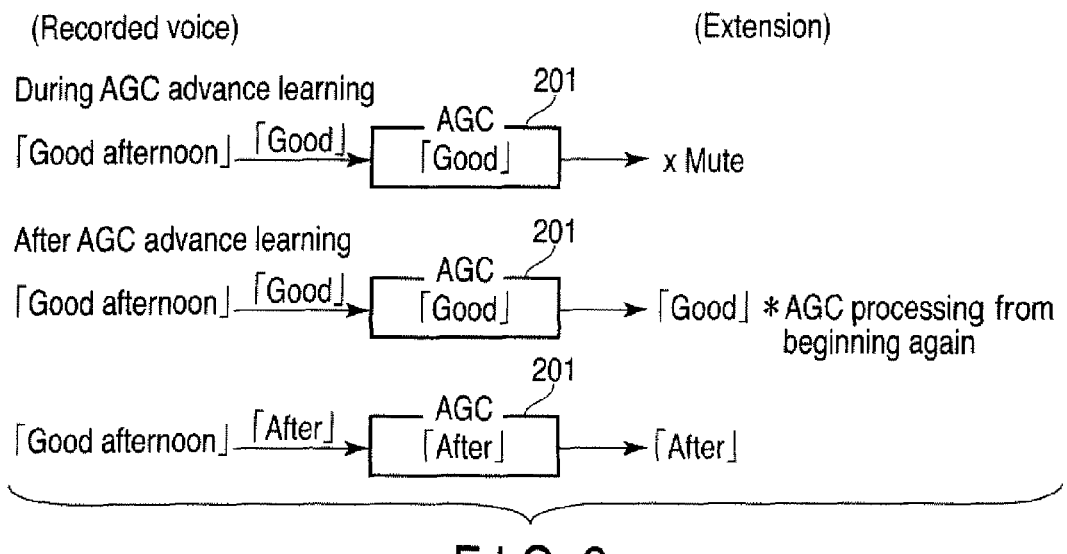
FIG. 2 is a sequence diagram illustrating a reproduction operation of a voice message in the first embodiment.

Various embodiments according to the invention will be described hereinafter with reference to the accompanying drawings. In general, according to one embodiment of the invention, a voice mail apparatus connected to a telephone exchange apparatus, recording a voice message sent out from the telephone terminal on a calling side in response to a termination call from the telephone exchange apparatus in any mail box among a plurality of mail boxes that are different for each of the telephone terminals and reproducing the voice message recorded in any mail box in accordance with reproduction instructions, comprising: a voice processor which processes voice messages by arbitrary processing gain; a gain controller which monitors a signal level of an output signal of the voice processor, and controls the processing gain of the voice processor to change the signal level into a specified level; and a processing controller which makes the gain controller to perform gain control of a learning voice by inputting a portion of the voice message into the voice processor as the learning voice when processing of the voice message is requested or based on predetermined conditions.

First Embodiment

FIG. 1 is a block diagram showing the configuration of an exchange system according to the first embodiment of the present invention and reference numeral 1 shows a private branch exchange apparatus 1.

The private branch exchange apparatus 1 includes trunk circuits 11-1 to 11-j (j is a natural number), line circuits 12-1 to 12-m, a time switch 13, a central control module 14, and a voice mail circuit 15 and, among these module, the trunk circuits 11-1 to 11-j, the line circuits 12-1 to 12-m, the central control module 14, and the voice mail circuit 15 are mutually connected via a control data bus 16. Moreover, the trunk circuits 11-1 to 11-j, the line circuits 12-1 to 12-m, the time switch 13, and the voice mail circuit 15 are mutually connected via a channel 17.

The trunk circuits 11-1 to 11-j are connected to a public network (not shown) via subscriber lines L-1 to L-j to perform processing to establish call connection with the public network.

The line circuits 12-1 to 12-m have a plurality of extensions and extension terminals DKT1 to DKTm are connected to these extensions respectively. Extension telephone sets are used, for example as the extension terminals DKT1 to DKTm. The line circuits 12-1 to 12-m perform call originating and terminating processing for the extension terminals DKT1 to DKTm, transfer processing of digital signals and the like.

The time switch 13 changes channels of digital signals transmitted among the trunk circuits 11-1 to 11-j, the line circuits 12-1 to 12-*m*, and the voice mail circuit 15 according to instructions of the central control module 14 via the channel 17.

The central control module 14 has a terminating response control function using the voice mail circuit 15, in addition to normal control functions such as call originating processing accompanying a call request from the extension terminals DKT1 to DKTm, normal call terminating processing accompanying an incoming call from the subscriber lines L-1 to L-j, and transfer processing among the extension terminals DKT1 to DKTm based on a control program stored in a storage module 18. The terminating response control function is a function that, when an incoming call arrives from an outside line, connects the voice mail circuit 15 and the outside line of the incoming call by making a termination call to the voice mail circuit 15 before making a termination call to the destination extension terminal DKT1, thereby performing control to have a predetermined announcement message sent out to the subscriber lines L-1 to L-j.

The voice mail circuit 15 is connected to a storage module 19 having mail boxes corresponding to the extension terminals DKT1 to DKTm to store a voice message from a calling party in any mail box.

Incidentally, a DSP 20 is connected to the voice mail circuit 15 in the first embodiment. A flash ROM 21 and a buffer 22 are connected to the DSP 20. The voice mail circuit 15, the storage module 19, the DSP 20, the flash ROM 21 and the buffer 22 constitute a voice mail unit of the present invention. Among these parts, predetermined voice messages such as Prompt are stored in the flash ROM 21. Voice messages stored in the storage module 19 can be rewritten from an external personal computer 23.

The DSP 20 includes an AGC function 201, which adjusts the signal level of a voice message input into the voice mail circuit 15 by the AGC function to a specified level.

When a voice message from any mail box of the storage module 19 is reproduced, the voice mail circuit 15 causes the DSP 20 to learn the AGC using a portion at the start of the voice message as a learning voice file and, after processing of the learning voice file terminates, inputs the voice message into the DSP 20 for processing. While the learning voice file is processed, the voice mail circuit 15 mutes voice, for example, to the requesting extension terminal DKT1.

Next, operations of the system configured as described above will be described.

Figure 3:
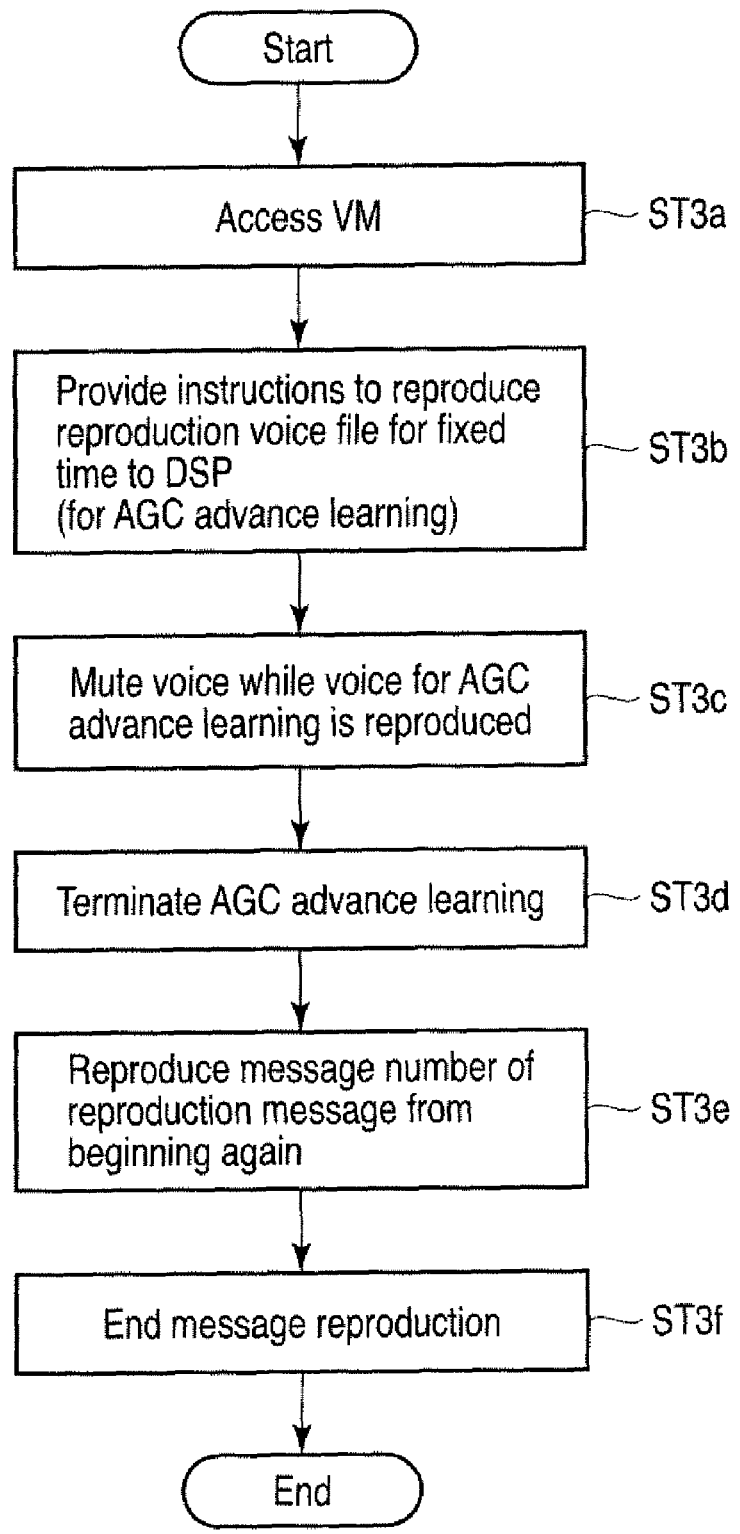
FIG. 3 is a flow chart showing a control processing procedure for a voice mail circuit when a voice message is reproduced in the first embodiment.

FIG. 2 is a sequence diagram illustrating a reproduction operation of a voice message and FIG. 3 is a flow chart showing a control processing procedure for the voice mail circuit 15 when a voice message is reproduced.

First, after starting up the system, assume that, for example, a user of the extension terminal DKT1 performs a call operation to the voice mail circuit 15. In that case, the voice mail circuit 15 prompts the user of the extension terminal DKT1 to enter security code. Then, the user of the extension terminal DKT1 enters the security code to log in to the voice mail circuit 15.

Next, assume that if there is any message, the user of the extension terminal DKT1 provides instructions to reproduce the message by input of a dual tone multi frequency (DTMF) through a dial operation. In that case, the voice mail circuit 15 transits from block ST3*a* to block ST3*b* and here provides instructions to the DSP 20 to reproduce an AGC learning voice file. In this case, the DSP 20 inputs, for example, "Good", which is a portion of "Good afternoon", at the start of the voice message stored in the storage module 19 for AGC learning.

At this point, while reproducing the AGC learning voice file, the voice mail circuit 15 puts the external terminal DKT1 into a mute state, allowing no voice to be heard (block ST3*c*). Loop-back within the DSP and output of no voice from the voice mail circuit 15 to the channel 17 can be considered as methods to put the external terminal DKT1 into a mute state.

Then, after a fixed time elapses, the voice mail circuit 15 transits from block ST3*d* to block ST3*e* and here reproduces a voice message from any mail box in the storage module 19 from the beginning and inputs the voice message into the DSP 20 before sending out the voice message whose level has been adjusted by the DSP 20 to the extension terminal DKT1 (block ST3*f*).

In the first embodiment, as described above, when a voice message from any mail box of the storage module 19 is reproduced by the voice mail circuit 15, a portion of the voice message is input into the DSP 20 as an AGC learning voice file to control the signal level of the learning voice file to a specified level in the DSP 20 before performing reproduction processing of the voice message and also voice to the requesting extension terminal DKT1 is muted by the voice mail circuit 15. Then, after a fixed time passes, a voice message reproduced from any mail box is input into the DSP 20 all over from the beginning for processing while a processing gain of the DSP 20 is maintained.

Therefore, the user of the extension terminal DKT1 can hear a voice message stored in any mail box of the storage module 19 in an optimal state. Also, a time needed to reach an optimal gain value can be reduced by causing the DSP 20 to learn the AGC suitable for each voice message by using a portion of the voice message to be reproduced so that voice messages in higher quality can be provided by reducing a rising sense and a falling sense when reproduction/recording starts.

Second Embodiment

Figure 4:
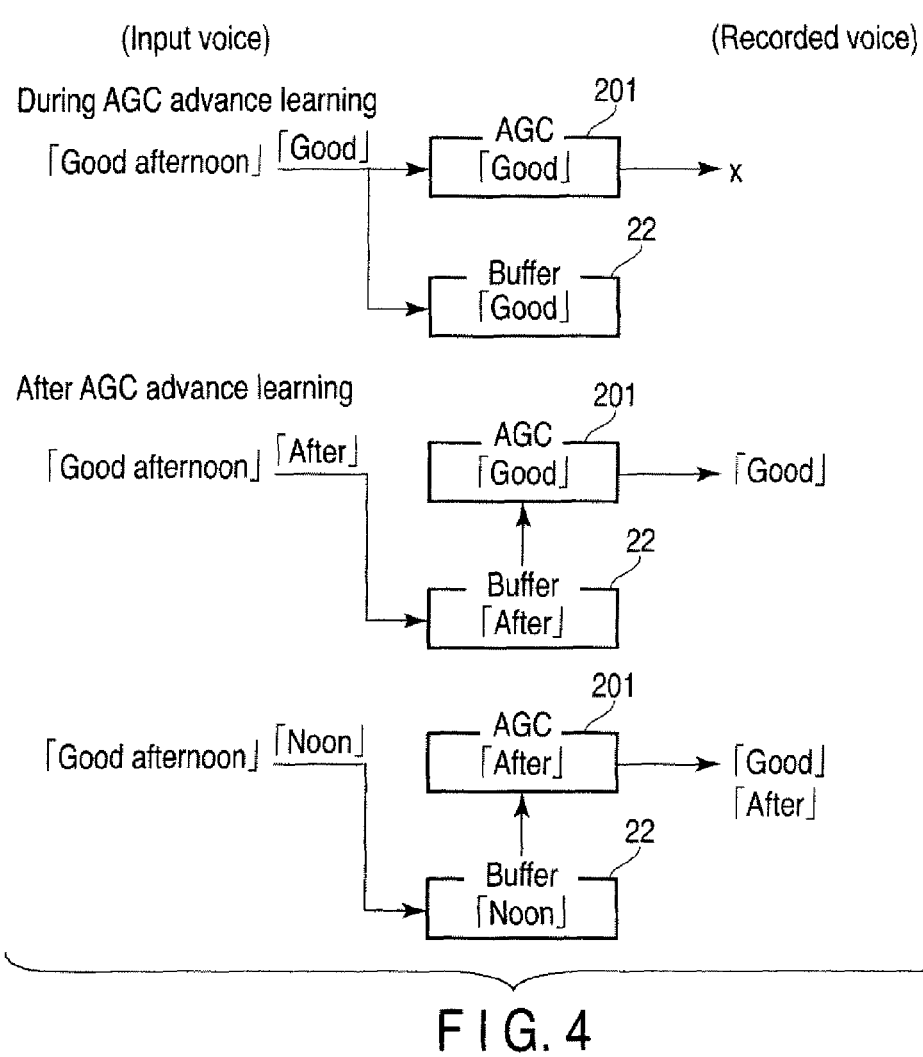
FIG. 4 is a sequence diagram illustrating the operation of recording a voice message as a second embodiment.
Figure 5:
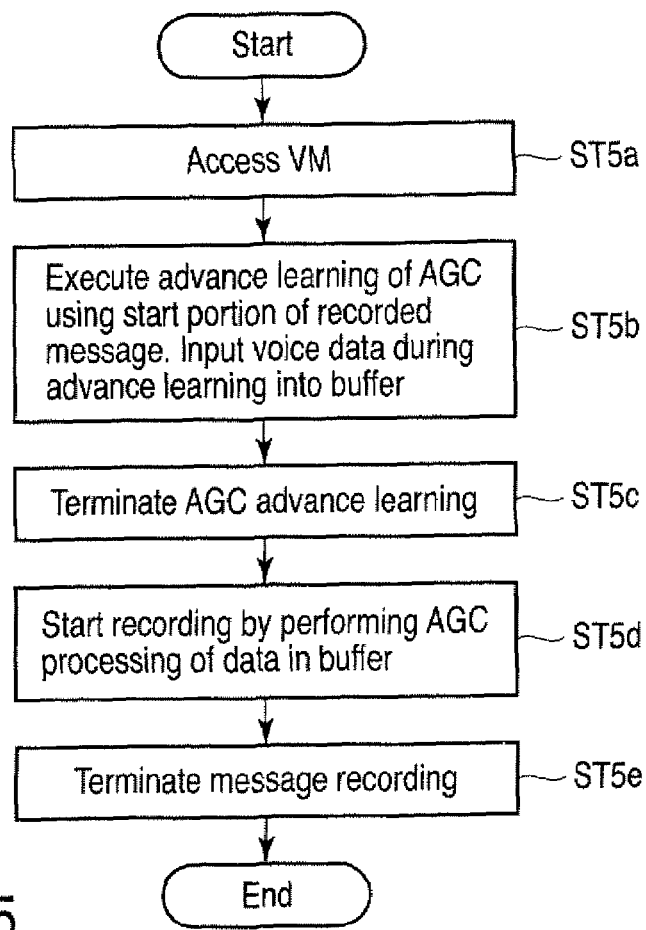
FIG. 5 is a flow chart showing the control processing procedure for the voice mail circuit when a voice message is recorded in the second embodiment.

FIG. 4 is a sequence diagram illustrating the operation of recording a voice message as the second embodiment. FIG. 5 is a flow chart showing the control processing procedure for the voice mail circuit 15 when a voice message is recorded.

First, the system is started up and the extension terminal DKT2 sets call forward to the voice mail circuit 15.

Then, assume, for example, that a terminating signal to the extension terminal DKT2 arrives from the extension terminal DKT1. In that case, the terminating signal is detected by the line circuit 11-1 and detection data thereof is transmitted to the central control module 14 via the control data bus 16. Then, the central control module 14 performs call terminating processing to the voice mail circuit 15 to be a call forward destination.

The voice mail circuit 15 transits from block ST5*a* to block ST5*b* and here causes the extension terminal DKT1 to hear greetings of the mail box corresponding to the extension terminal DKT2 to prompt the extension terminal DKT1 to record a message before entering a message recording state.

First, the DSP 20 executes advance AGC learning based on voice input from the extension terminal DKT1, for example, "Good" using the AGC function 201. At this point, "Good" at the start of a voice message is not stored in the storage module 19 and instead, stored in the buffer 22 for temporary storage. Then, when a fixed time passes and it is determined that the AGC advance learning by the AGC function 201 has terminated, the voice mail circuit 15 transits from block ST5*c* to block ST5*d* and here fetches data from the buffer 22 to perform AGC processing by the DSP 20 from the start of voice again before recording the voice in the storage module 19. The voice may also be recorded in the flash ROM 21.

Hereafter, if the user of the extension terminal DKT1 performs on-hook processing to end sending of the voice message, the voice mail circuit 15 terminates processing (block ST5e).

In the second embodiment, as described above, when a voice message is recorded in any mail box of the storage module 19, the voice mail circuit 15 inputs a portion of a voice message from the extension terminal DKT1 on the calling side into the DSP 20 as a learning voice file to cause the DSP 20 to execute advance AGC learning using the AGC function 201 before performing recording processing of the voice message. In the meantime, the voice message from the extension terminal DKT1 on the calling side is stored in the buffer 22 and after processing of the learning voice file by the AGC function 201 of the DSP 20 terminates, the voice message recorded in the buffer 22 is input into the DSP 20 for recording processing while maintaining the gain value of the DSP 20.

Figure 6:
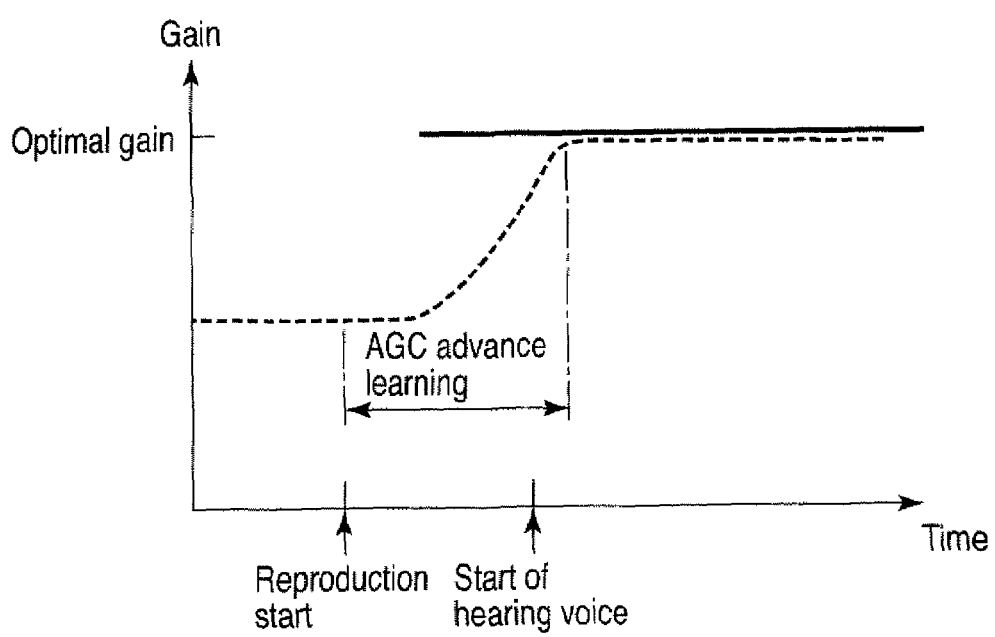
FIG. 6 is a diagram illustrating a change in gain of a voice message until the voice message starts to be heard after starting reproduction in the second embodiment.

Therefore, by using the buffer 22, the user of the extension terminal DKT1 can record a voice message in any mail box of the storage module 19 in an optimal sate. Since in this case a voice message of the optimal gain value is recorded in a mail box of the storage module 19 when recording the voice message, a voice message of the optimal gain value can directly be reproduced from any mail box when the voice message is reproduced. Thus, as shown by a solid line in FIG. 6, the user of the extension terminal DKT2 can hear a voice message in high quality when the recorded message starts to be heard due to the maximal gain value, suppressing a rising sense between a time of a recording start operation and a time when the voice message starts to be heard felt before. A dotted line in FIG. 6 shows transition of reproduction of the conventional voice message.

Other Embodiments

The present invention is not limited to the above embodiments. For example, an example of an incoming call from the extension terminal DKT1 is taken to describe the second embodiment, but incoming calls from the subscriber lines L-1 to L-j excluding that of the extension terminal DKT1 are also applicable.

In each of the above embodiments, examples of executing advance learning of voice by the AGC function 201 when a voice message is recorded or reproduced have been described, but a quiescent time of the private branch exchange 1 may be used to cause the DSP 20 to execute gain control of learning voice by the AGC function 201 by inputting portions of voice messages recorded in each of a plurality of mail boxes of the storage module 19 into the DSP 20 as learning voices. In this case, learning suitable for each voice message is executed during a quiescent time of the private branch exchange apparatus 1 and therefore, a voice message needs only to be directly input into the DSP 20 without performing gain control when the voice message is recorded or reproduced.

Alternatively, other conditions than the quiescent time of the private branch exchange apparatus 1 may also be used.

Also, in each of the above embodiments, examples of providing mail boxes each corresponding to a plurality of extension terminals in a voice mail apparatus have been described, but mail boxes corresponding to external telephone terminals other than extension terminals may be provided in the voice mail apparatus.

Also, in each of the above embodiments, examples of containing a voice mail apparatus in the private branch exchange apparatus 1 have been described, but the voice mail unit may be mounted outside the private branch exchange apparatus 1.

In addition, the configuration and type of system, configuration of the private branch exchange, type of extension terminal, recording or reproduction control procedure of voice messages, and control content thereof may be modified in various ways without deviating from the spirit of the present invention.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A voice mail apparatus connected to a telephone exchange apparatus performing exchange between a plurality of telephone terminals, recording a voice message sent out from the telephone terminal on a calling side in response to a termination call from the telephone exchange apparatus in any mail box among a plurality of mail boxes that are different for each of the telephone terminals and reproducing the voice message recorded in any mail box in accordance with reproduction instructions, comprising:
    a voice processor which processes voice messages by an arbitrary processing gain;
    a gain controller which monitors a signal level of an output signal of the voice processor, and automatically controls the processing gain of the voice processor to change the signal level into a specified level;
    a buffer which temporarily stores a voice message input into the voice processor; and
    a processing controller which performs gain control of a learning voice file by the gain controller by inputting a portion of the voice message into the voice processor as the learning voice file, stores the portion of the voice message in the buffer, when recording of the voice message is requested and, after the gain control of the learning voice file by the gain controller terminates, reads the voice message held in the buffer and inputs the voice message into the voice processor.

2. A method of controlling a voice mail apparatus connected to a telephone exchange apparatus between a plurality of telephone terminals, recording a voice message sent out from the telephone terminal on a calling side in response to a termination call from the telephone exchange apparatus in any mail box among a plurality of mail boxes that are different for each of the telephone terminals and reproducing the voice message recorded in any mail box in accordance with reproduction instructions, the method comprising:
    inputting a portion of the voice message as a learning voice file into a voice processor processing voice messages by an arbitrary processing gain, and temporarily storing the portion of the voice message in a buffer, when recording of the voice message is requested;

monitoring a signal level of an output signal of the voice processor;

controlling the processing gain of the voice processor to automatically change the signal level into a specified level; and reading the voice message held in the buffer, and inputting the voice message into the voice processor for processing, after gain control of the learning voice file terminates.

3. A voice mail apparatus connected to a telephone exchange apparatus performing exchanges between a plurality of telephone terminals and recording a voice message sent out from a telephone terminal on a calling side, comprising:

a storage module including a plurality of mail boxes to store the voice message;

a voice mail circuit coupled to the storage module, the voice mail circuit to reproduce the voice message;

a buffer coupled to the voice mail circuit, the buffer to temporarily store the voice message input into the voice processor; and a processor coupled to the voice mail circuit and the buffer, the processor to perform gain control of a learning voice file being a portion of the voice message, to store the portion of the voice message in the buffer, the processor using the learning voice file to automatically control a gain level for the voice message prior to storage of the voice message and reproduction of the voice message by the voice mail circuit, and when recording of the voice message is requested and, after the gain control of the learning voice file has completed, reading the voice message held in the buffer and inputting the voice message into the storage module.

4. The voice mail apparatus of claim 3, wherein the voice mail circuit mutes voice to a requesting telephone terminal while gain control of the learning voice file is performed.

* * * * *